(12) United States Patent
DeRosa et al.

(10) Patent No.: US 10,310,873 B1
(45) Date of Patent: Jun. 4, 2019

(54) PROBABILISTIC AGING COMMAND SORTING

(71) Applicant: Seagate Technology LLC, Cupertino, CA (US)

(72) Inventors: Jeffrey V DeRosa, Burlington, MA (US); LingZhi Yang, Firestone, CO (US); Kenneth L Barham, Longmont, CO (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/661,338

(22) Filed: Jul. 27, 2017

Related U.S. Application Data

(63) Continuation-in-part of application No. 14/471,981, filed on Aug. 28, 2014.

(51) Int. Cl.
*G06F 9/448* (2018.01)
*G06N 5/02* (2006.01)

(52) U.S. Cl.
CPC ............... *G06F 9/448* (2018.02); *G06N 5/02* (2013.01)

(58) Field of Classification Search
CPC ......... G06F 9/448; G06F 9/4421; G06N 5/02; H04L 47/622
See application file for complete search history.

(56) References Cited

U.S. PATENT DOCUMENTS

| | | | |
|---|---|---|---|
| 6,574,676 B1 | 6/2003 | Megiddo | |
| 6,848,020 B2 | 1/2005 | Hall | |
| 7,061,714 B1 | 6/2006 | Yu | |
| 2003/0182499 A1* | 9/2003 | Espeseth | G06F 3/0611 711/112 |
| 2004/0059770 A1 | 3/2004 | Bossen | |
| 2009/0077233 A1 | 3/2009 | Kurebayashi | |
| 2015/0100617 A1* | 4/2015 | Diederich | H04L 67/325 709/201 |

* cited by examiner

*Primary Examiner* — Idriss N Alrobaye
*Assistant Examiner* — Ronald T Modo
(74) *Attorney, Agent, or Firm* — Cesari & Reed, LLP; Kirk A. Cesari; Christian W. Best

(57) ABSTRACT

Systems and methods are disclosed for probabilistic aging command sorting, including adjusting an execution order for a command based on a probability of the command reaching a time out threshold. The system may determine a probability of a command timing out using a lookup table for a base queue depth, modified by a scalar value obtained from a queue depth adjustment lookup table using the actual queue depth as an index. In this manner, an accurate probability of a command timing out for a given queue depth can be determine without significant computational overhead.

20 Claims, 13 Drawing Sheets

| Queue Depth "Q" | log ((Q - 1)/Q) / log ((128-1) / 128)) |
|---|---|
| 2 | 88.38 |
| 3 | 51.70 |
| 4 | 36.68 |

⋮

| 31 | 4.18 |
|---|---|
| 32 | 4.05 |
| 33 | 3.92 |

⋮

| 63 | 2.04 |
|---|---|
| 64 | 2.01 |

⋮

| 127 | 1.01 |
|---|---|
| 128 | 1 |

FIG. 9

PROBABILISTIC AGING COMMAND SORTING

CROSS-REFERENCE TO RELATED APPLICATION

The present application is a continuation-in-part of and claims priority to pending U.S. patent application, application Ser. No. 14/471,981, filed Aug. 28, 2014, entitled "Probabilistic Aging Command Sorting," the contents of which are hereby incorporated by reference in their entirety.

SUMMARY

In certain embodiments, an apparatus may comprise a circuit configured to determine a first access time to execute a selected command from a command queue, determine a queue depth value representing a number of pending commands in the command queue, and determine a scaling value from a queue depth adjustment table based on the queue depth value. The circuit may be further configured to determine a numerical value representing a probability of the selected command reaching a time-out threshold based on the scaling value and a time-out probability table for a base queue depth, the time-out threshold representing a period within which the selected command must be executed to avoid failure of the selected command, and the time out probability table storing probability values of commands timing out at a pre-set base queue depth. The circuit may determine an adjusted access time for the selected command by modifying the first access time based on a calculation including the first access time and the numerical value representing the probability, and execute the selected command based on the adjusted access time.

In certain embodiments, an apparatus may comprise a disc data storage medium, and a circuit. The circuit may be configured to determine a first access time to execute a selected command from a command queue, and determine a scaling value from a queue depth adjustment table based on a number of pending commands in the command queue. The circuit may further determine a numerical probability value representing a probability of the selected command reaching a time-out threshold based on the scaling value and a time-out probability table for a base queue depth, the time-out threshold representing a period within which the selected command must be executed to avoid failure of the selected command, and the time out probability table storing probability values of commands timing out at a pre-set base queue depth. The circuit may calculate an adjusted access time for the selected command by modifying the first access time based on the numerical probability value, compare the adjusted access time for the selected command to access times for other commands in the command queue to select a chosen command to execute, and execute the chosen command by accessing the disc data storage medium.

In certain embodiments, a method may comprise determining, at a data storage device, a first access time to execute a selected command from a command queue, determining a queue depth value representing a number of pending commands in the command queue, and determining a scaling value using a queue depth adjustment lookup table based on the queue depth value. The method may further comprise determining a numerical value representing a probability of the selected command reaching a time-out threshold based on the scaling value and a time-out probability table for a base queue depth, the time-out threshold representing a period within which the selected command must be executed to avoid failure of the selected command, and the time out probability table storing probability values of commands timing out at a pre-set base queue depth. The method may include determining an adjusted access time for the selected command by modifying the first access time based on a calculation including the first access time and the numerical value representing the probability, and executing the selected command based on the adjusted access time.

BRIEF DESCRIPTION OF THE DRAWINGS

FIG. 9 is a diagram of a table for probabilistic aging command sorting, in accordance with certain embodiments of the present disclosure;

DETAILED DESCRIPTION

Figure 1:
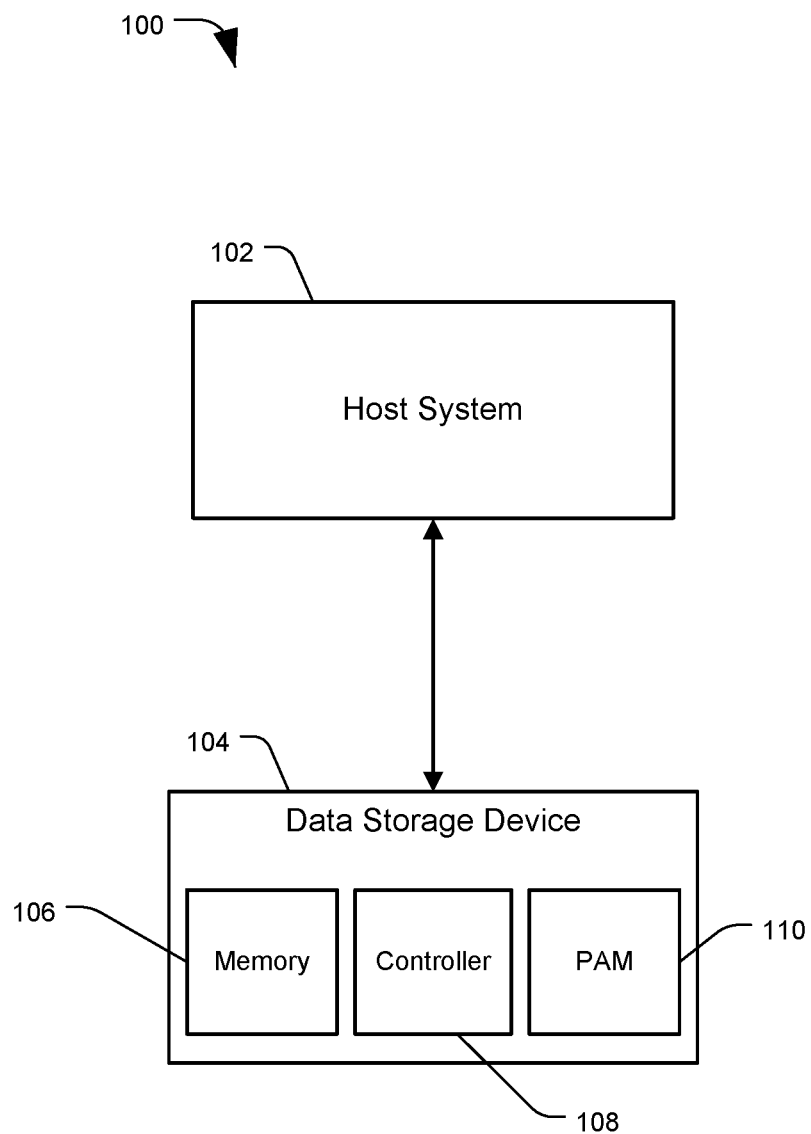
FIG. 1 is a diagram of a system employing probabilistic aging command sorting, in accordance with certain embodiments of the present disclosure.

In the following detailed description of certain embodiments, reference is made to the accompanying drawings which form a part hereof, and in which are shown by way of illustration of example embodiments. It is also to be understood that features of the embodiments and examples herein can be combined, exchanged, or removed, other embodiments may be utilized or created, and structural changes may be made without departing from the scope of the present disclosure.

In accordance with various embodiments, the methods and functions described herein may be implemented as one or more software programs running on a computer processor or controller. Dedicated hardware implementations including, but not limited to, application specific integrated circuits, programmable logic arrays, and other hardware devices can likewise be constructed to implement the methods and functions described herein. Further, the methods described herein may be implemented as a computer readable storage medium or memory device including instructions that, when executed, cause a processor to perform the methods.

In computing devices, queueing may be used to store commands or tasks for subsequent execution. Various service disciplines can be used with selecting a command from the queue for servicing, for example, first-in-first-out, last-in-first-out, shortest processing time, and shortest access time to name a few. In queueing environments where the factors affecting the selection of the next command for execution are non-uniform, for example where some aspect of the commands may favor the selection of one command in preference to another, it is possible for an unfortunate command to linger in the queue awaiting execution. This lingering may be referred to as "starvation". To prevent commands from starving, time limits may be imposed. These time limits can impose a deadline beyond which the command must be serviced. However, the disruption of executing a command that has met its time limit at that instant may reduce the overall performance of the system. Selecting the command at some earlier time, prior to meeting its time limit, may result in a smaller disruption and optimization of the overall performance of the system.

The problem of disruptive servicing may be readily apparent in the context of a hard disc drive. In a disc drive, read and write command requests may be sent by a host computer to the drive, where they may be queued while they await execution. The queue of commands received from the host may be referred to as the command queue or host queue, and the number of commands in the queue may be referred to as the queue depth. The data associated with a disc drive command can have locational attributes, such as its rotational offset and track position (e.g. radius). In selecting the next command to execute after the currently executing command is completed, a disc drive might calculate the access time for all of the commands in the queue from the end of the currently-executing command and select the command with the shortest access time from the ending position of the current command. For example, U.S. Pat. No. 6,445,531 by Gaertner et al., the disclosure of which is incorporated herein by reference, describes one such method of selection.

As discussed above, in computing devices such as disc drives commands may have a time limit within which they are to be executed. If a command is not executed within the time limit, it may "time out" or become "stale," which may result in the device which issued the command to consider the command lost or failed. In some embodiments, a device may be configured to immediately service a command that has timed out. This may be negatively disruptive to the overall performance of the device. For example, consider the case where a disc drive's actuator is at the outer edge of the disc and the command timing out is at the inner edge of the disc. The drive may need to seek the actuator across the entire surface of the disk to service the command. Thus, if a command reaches this time-out limit it can lower overall performance of a device as, for example, the command is not timely executed, other commands are delayed, the command must be re-submitted, etc. The problem may be especially exacerbated in certain workloads. For example, disc drive workloads especially prone to timeouts may include those with a high command queue depth, low time-out limits, data block emulated (e.g. 5XXE) read-modify-write workloads, priority queueing, other workloads, or any combination thereof.

More generally, commands reaching a time-out limit can arise in any devices or systems employing a command queue, where multiple pending commands are collected for execution. Commands in a command queue may be sorted, for example according to an efficient processing order, selected one-at-a-time for execution in a most efficient manner, or otherwise optimized for performance. Command queues may improve overall performance (e.g. input/output (I/O) rate) by executing operations in an intelligent order. However, certain operations may not integrate with other pending operations, may be spatially distant from other operation locations, may have a low priority, or otherwise have a reduced chance of selection for activation, and may therefore be pushed up the queue, or "put off" until they time-out. An example of a system employing command queuing can be seen in FIG. 1.

FIG. 1 is a diagram of a system 100 employing probabilistic aging command sorting, in accordance with certain embodiments of the present disclosure. The system 100 may include a host 102 and a data storage device (DSD) 104. The host 102 may also be referred to as the host system or host computer. The host 102 can generally be any device that utilizes a data storage device, for example, a desktop computer, a laptop computer, a server, a tablet computer, a telephone, a photocopier, a music player, another electronic device, or any combination thereof. Similarly, the DSD 104 may be any of the above-listed devices, or any other device which may be used to store or retrieve data, such as a solid-state drive (SSD), a hard disk drive (HDD) or hybrid hard-drive (HHD). The host 102 and DSD 104 may be connected by way of a wired or wireless connection, or by a local area network (LAN) or wide area network (WAN). In some embodiments, the DSD 104 can be a stand-alone device not connected to a host 102 (e.g. a removable data storage device having its own case or housing), or the host 102 and DSD 104 may both be part of a single unit (e.g. a computer having an internal hard drive).

The DSD 104 may include a memory 106 and a controller 108. The memory 106 may comprise magnetic storage media such as disc drives, nonvolatile solid state memories such as Flash memory, RAM, ROM, other types of memory, or a combination thereof. Memory 106 may store user data, a command queue for pending operations, other data, or a combination thereof. The controller 108 may comprise one or more circuits or processors configured to control operations of the data storage device 104, such as storing data to or retrieving data from the memory 106. The DSD 104 may receive a data read or write request, processing requests, or other requests from the host device 102, and use the controller 108 to perform operations based on the request.

In some embodiments, host 102 may send a series of input or output (I/O) commands or requests to DSD 104, such as instructions to store data to or retrieve data from memory 106. DSD 104 may place the requests into a command queue, and activate the operations based on a logical execution order. For example, memory 106 may include a disc storage medium. Data may be retrieved from or stored to the disc using a magnetic transducer head on an arm which can move across the disc surface as the disc spins. An efficient order for executing the I/O operations may include minimizing an amount of time to mechanically move the arm and spin the disc in between operations. For example, this may include grouping commands from the queue that require accessing locations on the disc that are near to each other.

However, if a chosen command requires accessing a portion of the memory that is not near to the locations for other commands, execution of the chosen command may be postponed, and the command may time-out, or reach an age threshold, before the command is executed.

A time out period for commands may be specified by host 102 when issuing commands, included as part of the configurations of DSD 104, included as part of the communication protocol used to transfer commands from host 102 to DSD 104, or otherwise defined. For example, if the host 102 and DSD 104 communicate using the small computer system interface (SCSI), the command timeout period may be defined as part of the interface. The SCSI interface may have a default time-out period, or the time-out period can be modified or overridden by a device manufacturer, for example by using mode page configurations.

In some embodiments, multiple time-out periods or thresholds may be used. For example, there may be a "hard" timeout period where a host may consider a command failed if no response is received, and a shorter "soft" timeout threshold that requires a device to execute a command so that the hard timeout threshold is not reached. In some embodiments, a device may have multiple tiers of timing thresholds, or multiple age thresholds that may influence device behavior. In some embodiments, different timeout values may be applied for different types of operations, such as based on an estimated execution time. For example, read commands, write commands, cached write commands, and other operations may have different timeout age thresholds. One or more age thresholds may be based on host-supplied parameters. For example, a host may explicitly specify an age threshold for a command, or it may include information such as a priority value for commands (e.g. a numerical priority rating from 0 through 15). A device may assign a timeout threshold to each command based on a priority level for the command. Other embodiments are also possible.

In certain embodiments, a device may determine timeout values or thresholds for each command, for different groups or categories of command, or for all commands based on a variety of factors. For example, a device may select a timeout threshold based on a state of the command queue. In some embodiments, an age threshold may be set lower for a smaller queue depth (e.g. number of pending commands in the queue, as discussed below), or high for a larger queue depth. In some embodiments, the age threshold may be set based on a locality of the commands, or a breadth of a storage device LBA space to be accessed by a set of commands in the command queue. For example, the threshold may vary depending on whether the pending commands are all directed to a span of LBAs of a disc memory that includes only 1-5% of the LBA space and timeouts are unlikely, or whether the pending commands include 85% of the LBA space and timeouts are more likely. In some embodiments, the timeout threshold may vary based on transfer lengths of commands in the command queue. For example, the threshold may vary based a number of sectors to be accessed for a given command, or for a set of commands, where longer read or write operations may reduce a total number of I/O operations that can be completed in a period of time. Other embodiments are also possible.

If a command in the command queue reaches a time-out age threshold, the DSD 104 may halt the selection of other commands and service the command that has reached the age threshold. This operation may not be optimized for time or performance, and may be performed at the native unqueued I/O rate for the DSD 104. In addition, this operation may interrupt a series of efficiently organized operations in the command queue, costing performance efficiency for the queued commands as well. Accordingly, it may be beneficial to execute commands before they time out, at a point in the queue where execution would be superior to the unqueued I/O rate. By calculating the probability of timing-out and incorporating this information into the calculation of the overall access time, it is possible to greatly reduce the performance losses due to command time-outs.

Accordingly, DSD 104 may include a probabilistic aging module (PAM) 110. The PAM 110 may be one or more processors, controllers, or other circuits, or it may be a set of software instructions that, when executed by a processing device, perform the functions of the PAM 110. In some embodiments, the PAM 110 may be part of the controller 108, or executed by the controller 108. The PAM 110 may control operations of DSD 104 relating to calculating a probability of commands timing out, and incorporating the probability into the access time calculation for command ordering.

Figure 8:
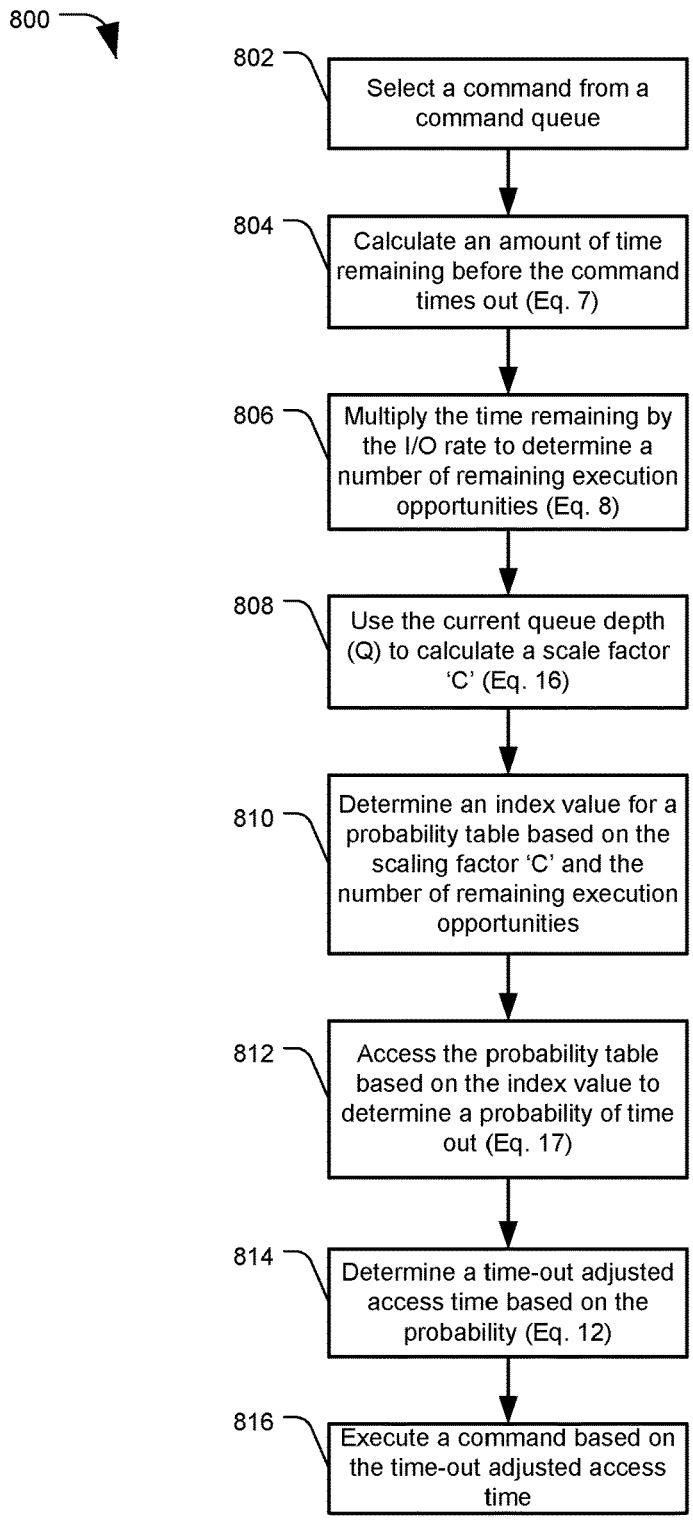
FIG. 8 is a flowchart of a method for probabilistic aging command sorting, in accordance with certain embodiments of the present disclosure.
Figure 10:
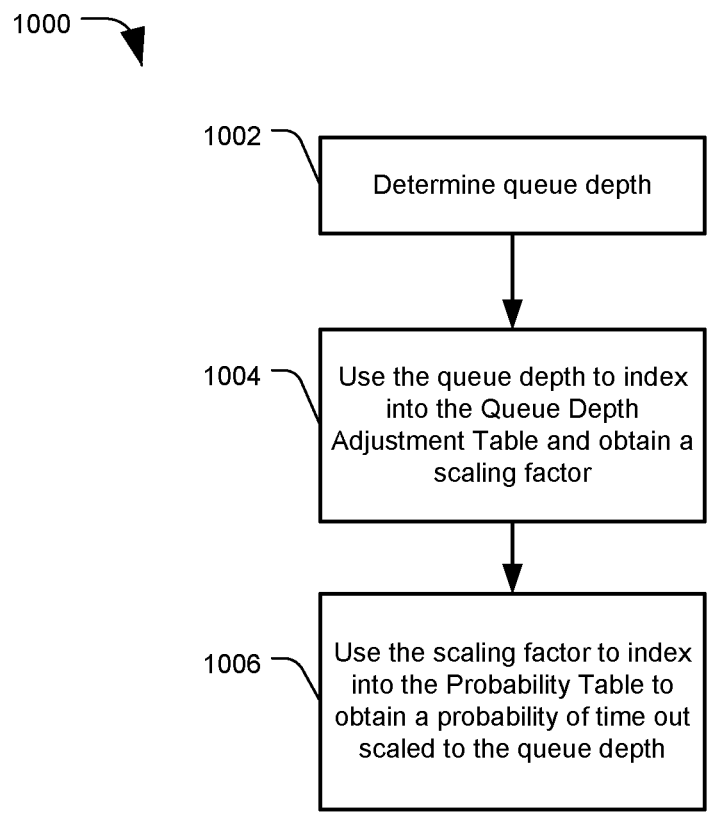
FIG. 10 is a flowchart of a method for probabilistic aging command sorting, in accordance with certain embodiments of the present disclosure.

In some embodiments, the PAM 110 may control access time adjustment for operations in the command queue based on a probability of timing out, such as by executing the methods described in relation to FIGS. 8 through 10. For example, the PAM 110 may calculate a baseline access time for an operation and adjust the access time by an adjustment function. The adjustment function may include a variety of variables, for example, the adjustment may be determined as a function of the quantity of commands in the queue, the time remaining for an operation before timeout, the average execution time of commands, transfer lengths of other functions in the queue, etc. In some embodiments, the process may be repeated for all commands in the queue, and then the command with the shortest adjusted access time may be selected for execution. In some embodiments, the PAM 110 may sort operations in the command queue based on their time out adjusted access times. Other embodiments are also possible.

Figure 2:
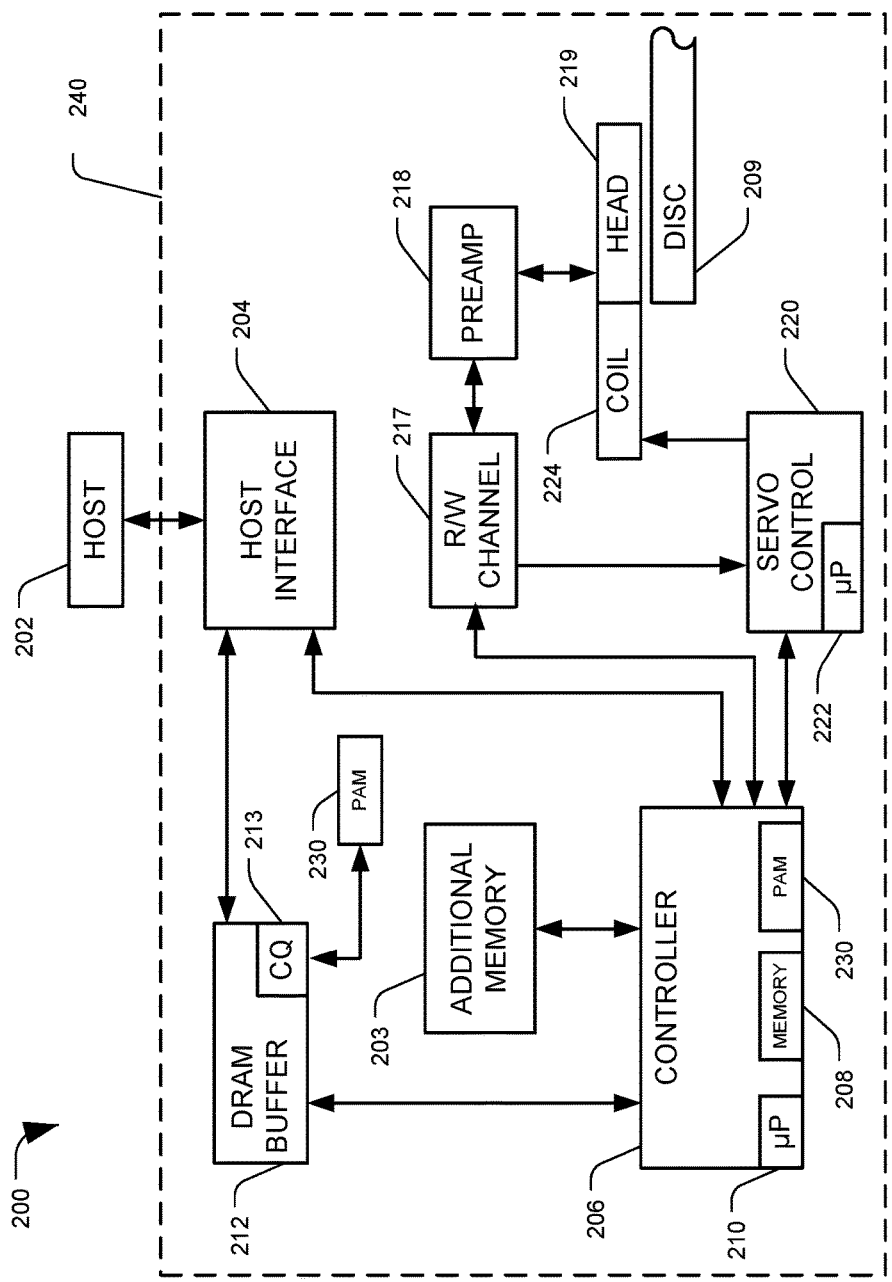
FIG. 2 is a diagram of a system employing probabilistic aging command sorting, in accordance with certain embodiments of the present disclosure.

FIG. 2 is a diagram of a system employing probabilistic aging command sorting, in accordance with certain embodiments of the present disclosure. Specifically, FIG. 2 provides a functional block diagram of an example data storage device (DSD) 200. The DSD 200 may be a data storage device such as the device 104 shown in FIG. 1. The DSD 200 can communicate with a host device 202 (such as the host system 102 shown in FIG. 1) via a hardware or firmware-based interface circuit 204. The interface 204 may comprise any interface that allows communication between a host 202 and a DSD 200, either wired or wireless, such as USB, IEEE 1394, Compact Flash, SATA, eSATA, PATA, SCSI, SAS, PCIe, Fibre Channel, Ethernet, or Thunderbolt, among others. The interface 204 may include a connector (not shown) that allows the DSD 200 to be physically removed from the host 202. In some embodiments, the DSD 200 may have a casing 240 housing the components of the DSD 200 or the components of the DSD 200 may be attached to the housing, or a combination thereof. The DSD 200 may communicate with the host 202 through the interface 204 over wired or wireless communication. In some embodiments, DSD 200 may be a stand-alone device that does not connect to a host. In some embodiments, interface 204 may be used to connect to a network, or DSD 200 may include a network interface (not shown) in addition to the host interface 204.

The buffer 212 can temporarily store data during read and write operations, and can include a command queue (CQ)

213 where multiple pending operations can be temporarily stored pending execution. Commands arriving over the interface 204 may automatically be received in the CQ 213 or may be stored there by controller 206, interface 204, or another component. Commands may be organized in the CQ 213 by the controller 206, a probabilistic aging module (PAM) 230, by other components, or a combination thereof.

The DSD 200 can include a programmable controller 206, which can include associated memory 208 and processor 210. In some embodiments, the DSD 200 can include a read-write (R/W) channel 217, which can encode data during write operations and reconstruct user data retrieved from a memory, such as disc(s) 209, during read operations. A preamplifier circuit (preamp) 218 can apply write currents to the head(s) 219 and provides pre-amplification of readback signals. Head(s) 219 may include a read head element and a write head element (not shown). A servo control circuit 220 may use servo data to provide the appropriate current to the coil 224, sometimes called a voice coil motor (VCM), to adjust an arm (not shown) to position the head(s) 219 over a desired area of the disc(s) 209. The controller 206 can communicate with a processor 222 to move the head(s) 219 to the desired locations on the disc(s) 209 during execution of various pending commands in the command queue 213. In some embodiments, the DSD 200 can include an additional memory 203, which can be either volatile memory such as DRAM or SRAM, or non-volatile memory, such as NAND Flash memory. For example, the DSD 200 may include solid state memory instead of or in addition to disc memory. The additional memory 203 can function as a cache and store recently or frequently read or written data, or data likely to be read soon. Additional memory 203 may also function as main storage instead of or in addition to disc(s) 209. A DSD 200 containing multiple types of nonvolatile storage mediums, such as a disc(s) 209 and Flash 203, may be referred to as a hybrid storage device.

DSD 200 may include a PAM 230. The PAM 230 may be a processor, controller, or other circuit, or it may be a set of software instructions that, when executed by a processing device, perform the functions of the PAM 230. In some embodiments, the PAM 230 may be part of the controller 108, or executed by the controller 206. In some embodiments, the PAM 110 may control access time adjustment for operations in the CQ 213 based on a probability of timing out, such as by executing the methods described in relation to FIGS. 1 and 8.

Figure 3:
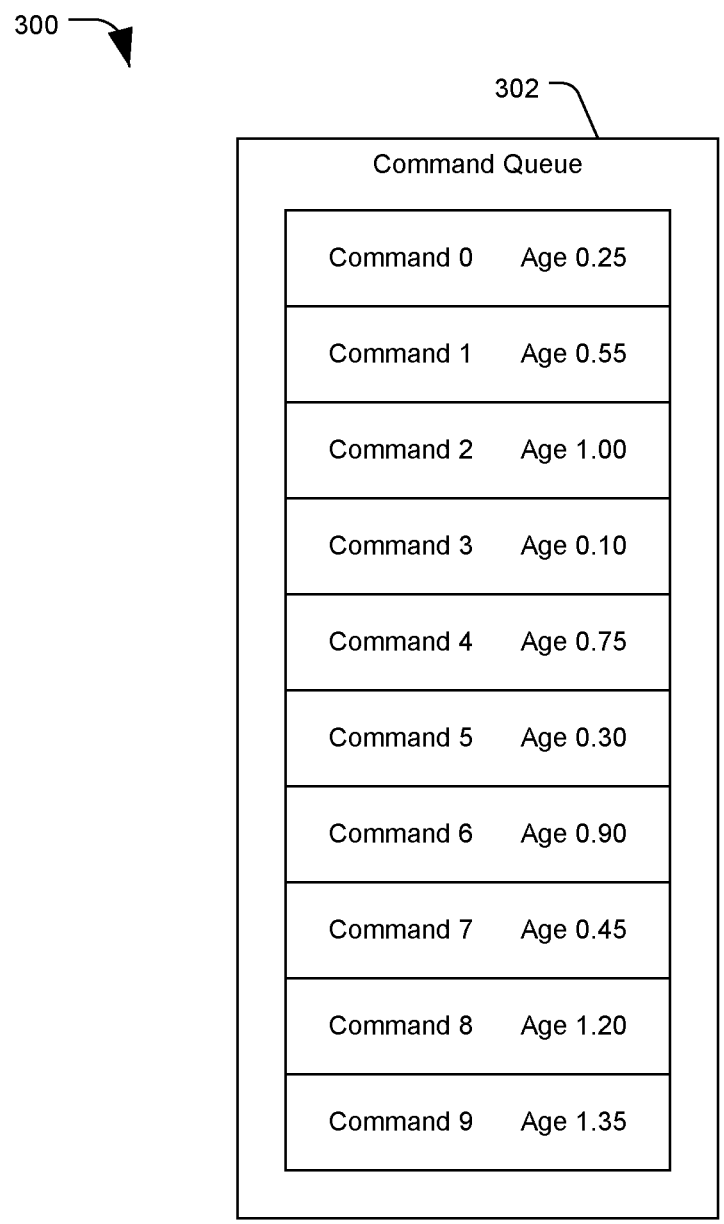
FIG. 3 is a diagram of a system employing probabilistic aging command sorting, in accordance with certain embodiments of the present disclosure.

FIG. 3 is a diagram 300 of a system employing probabilistic aging command sorting, in accordance with certain embodiments of the present disclosure. The diagram 300 includes a command queue (CQ) 302, such as may be maintained by a data storage device to store and organize pending commands. CQ 302 contains ten pending operations, ordered as command 0 through command 9. The number of pending commands may be referred to as the queue depth of a command queue; in this example embodiment, CQ 302 has a queue depth of ten. The commands in a command queue may have one or more non-uniform attributes which can influence the selection of which command to execute next, or for a selected execution order of the commands. For example, each command may have one or more target sectors corresponding to transducer head and disc locations, which may influence an access time for that command. Other attributes may include priority levels, transfer times, whether requested data exists in a cache, or other attributes.

In addition, a system employing a probabilistic aging algorithm may track an age for each command in queue, as shown in FIG. 3. A device may store the actual age value, a number of clock ticks since receipt, a timestamp of when the command was received from which the age can be calculated as needed, or the age may be monitored by other methods. In diagram 300, the age is shown for each command in terms of seconds since the command was received. Although the commands in the queue of FIG. 3 are shown as tightly packed and ordered, they may be sparsely arranged or, more generally, may be organized in any logical fashion suitable for the circuitry of the data storage device.

In addition, commands may have a designated time-out age threshold, for example 1.5 seconds, although longer or shorter time out periods may be used. If a command reaches the time out threshold without being executed, the command may expire, or it may be executed immediately regardless of its position in the CQ 302. Assuming commands are queued such that commands with a lower command number are executed earliest, FIG. 3 depicts an example in which the last command in the queue, command 9, may be approaching the 1.5 second time-out age threshold with an age of 1.35 seconds. A device may calculate a probability of a command timing out, and factor that probability into an algorithm for organizing pending operations. For example, a probability of a command timing out may be weighed against a performance loss (e.g. based on an IO rate of executing queued vs. unqueued commands) to determine when to execute the command.

A device may calculate a probability of timing out, and an effect on performance, using a number of calculations and approximations. In some embodiments, performance calculations or estimates may be performed outside the device, for example by a manufacturer or other party. For example, some values and estimates may be pre-loaded on a device, or updated in the device firmware with a software update. This may save processing time at the device and improve performance.

An example process of calculating a probability of timing out is provided herein. At an example queue depth of 64 commands, the odds of a command not being picked for activation may be approximately 63 out of 64, since only one command may be activated at a time. The odds of this happening two times in a row is may be $(63/64)^2$. The odds of this happening 'X' times in a row may be $(63/64)^x$. The more general form of this equation may be:

$$\text{Probability of Time-Out} = ((\text{queue depth} - 1)/(\text{queue depth}))^x \qquad \text{Eq.1:}$$

where "X" is the number of times the command is not picked for activation.

By knowing the I/O rate for a given workload (e.g. workload may be based on queue depth) and the amount of time remaining before a command will time out, it is possible to calculate the probability that a command will time out in the future. For example, at queue depth 64, suppose a given drive can perform at an approximate I/O rate of 300 I/O's per second. In some embodiments, the larger the queue depth, the more I/O's per second can be performed by a given drive, but the more time outs may occur. An approximate I/O rate for a given queue depth for a given drive can be determined during a manufacturing process, or may be determined by a drive based on performance measurements. For example, the approximate I/O rate for a selected number of queue depths may be stored on a drive, and the drive may consult a lookup table (LUT) for a nearest I/O rate approximation based on the current queue depth. In some embodiments, an I/O rate approximation for a single selected queue depth may be used to simplify the probability calculation.

If a command in the 64 depth queue has one second remaining before it times out, and the drive performs at approximately 300 I/O operations per second at 64 queue depth, this can leave approximately 300 opportunities for activation of the command: (I/Os per second*(time remaining until time out)). The number of opportunities remaining can be inserted into Equation 1 as the value of "X" to determine a probability of the command timing out. Using Equation 1, the probability of this command timing out may be:

$$\text{Probability of Time-Out}=(63/64)^{300}=0.0089$$

Figure 4:
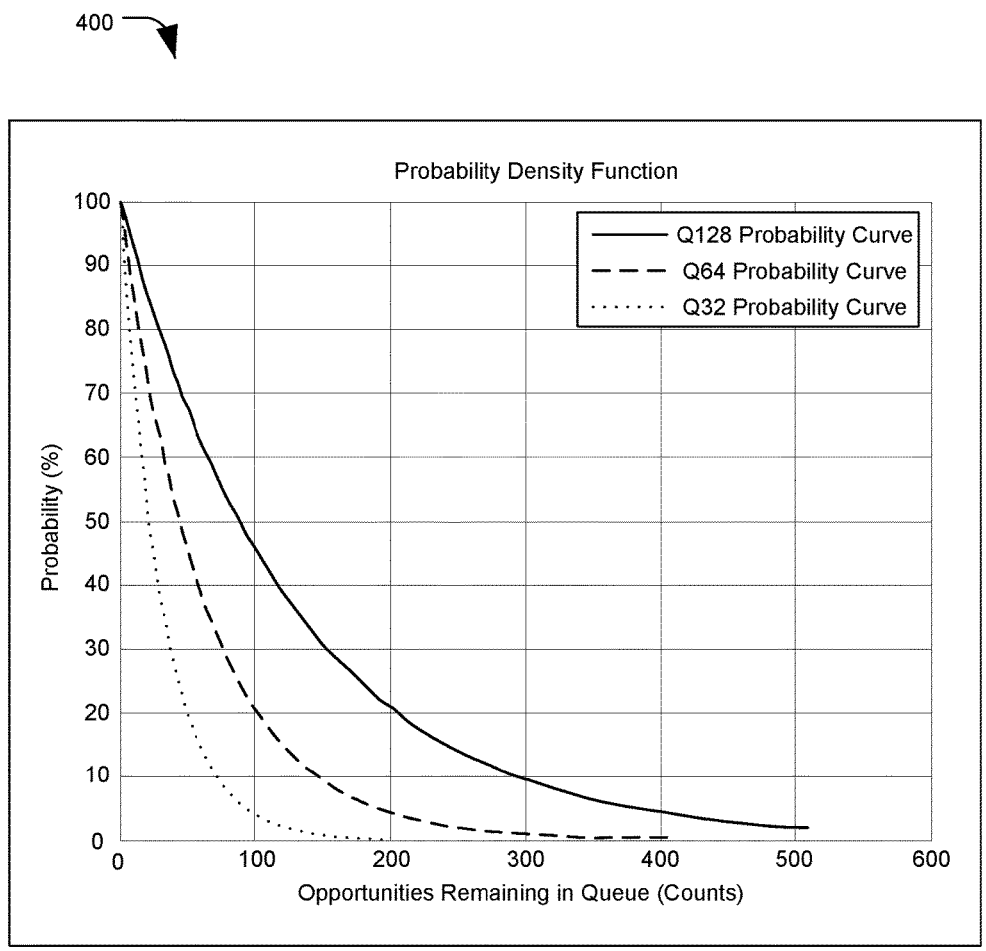
FIG. 4 is a graph of a system employing probabilistic aging command sorting, in accordance with certain embodiments of the present disclosure.

FIG. 4 is a graph 400 of a system employing probabilistic aging command sorting, in accordance with certain embodiments of the present disclosure. In particular, FIG. 4 displays Equation 1 for various example queue depths. The Y-axis, labeled "probability," represents the odds of a command timing out while waiting in the command queue. The X-axis, labeled "Opportunities Remaining in Queue (Counts)," may represent the value "X" in Equation 1. The more opportunities remaining to execute the command before it times out, the lower the odds that the command will time out. The smaller the queue, the lower the chances of a command timing out before it is executed. As shown in graph 400, the smallest example queue depth of 32 quickly approaches a negligible probability of timing out. Larger queues, such as represented by the Q128 probability curve, still have approximately 2% probability of a given command timing out, even with 500 opportunities remaining in queue.

A drive may calculate an access time for a selected command to determine approximately how long it may take for the command to begin execution after the end of the current command being executed completes. This may be considered the "base" access time. For example with a disc-based data storage device, access time may be approximately calculated as a seek time (e.g. the time it takes to move a transducer head from a starting position to a target data track) plus additional rotational latency (e.g. the time it will take for the disc to rotate so that the head is positioned over the target data sectors on the track). The access time may be calculated from a given starting disc and head position, for example based on a calculated head and disc location after executing a previous operation.

After the base access time has been calculated for a selected command, an adjustment to this value may be added based on the command's probability of timing out. Instead of or in addition to the number of I/O operations per second, I/O rates or operation times may also be expressed in terms of "wedges." A "wedge," as used herein, can refer to a fraction of a revolution of a disc storage medium. For example, a disc may have 500 "wedges" or "spokes" in a full rotation. Accordingly, requiring 500 wedges for performing unqueued IO commands may indicate that, on average, a drive spins a disc 500 wedges to complete the IO operation, while the drive may only need to spin the disc 300 wedges to execute an average IO command when running at a queue depth of 128 commands. "Wedges" may also be thought of as a measure of time, wherein an operation that takes 500 wedges to complete takes longer than an operation requiring 300 wedges. As an example conversion, if a drive operating at a 128 queue depth performs and average of 300 wedges per I/O operation, and 300 I/O operations per second, the drive may perform at an average of 90,000 wedges per second (number of wedges per I/O operation*number of I/O operations per second). Assuming that a drive has a maximum rotation speed, performing unqueued operations at a higher wedge count of 500 wedges per I/O would accordingly reduce the number of I/O operations that could be completed in a given time frame.

Figure 5:
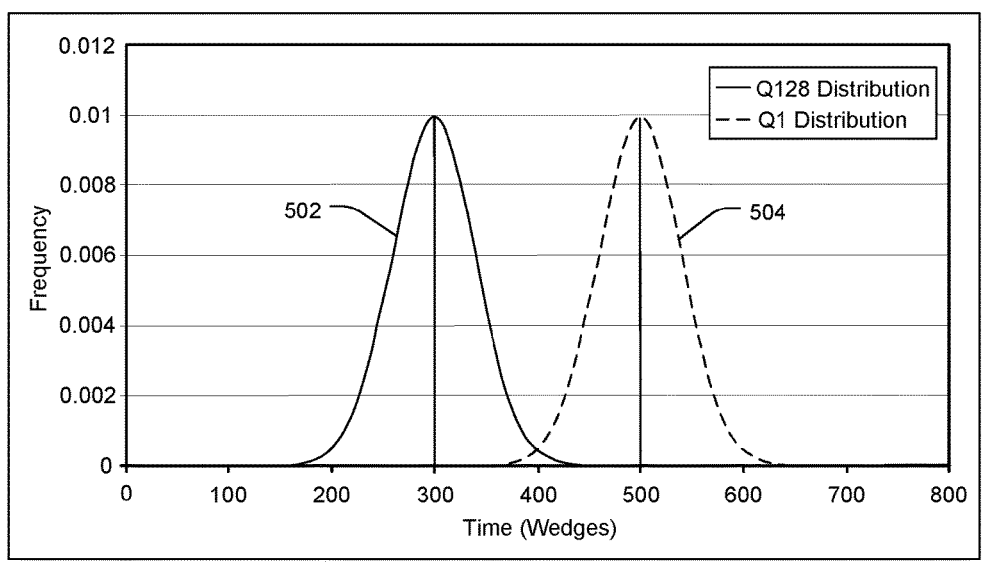
FIG. 5 is a graph of a system employing probabilistic aging command sorting, in accordance with certain embodiments of the present disclosure.

Assume that a given drive can perform at an average rate of 500 wedges per I/O when performing unqueued commands, and at an average rate of 300 wedges per I/O when operating at queue depth 128. Both I/O rates may have a distribution about the mean that is normal. FIG. 5 is a graph 500 of a system employing probabilistic aging command sorting, in accordance with certain embodiments of the present disclosure. Graph 500 depicts the normal I/O distribution rate around the mean for unqueued operations, at 504, and for operations when operating at a queue depth of 128, at 502. Also assume that for a selected command, the probability of it timing out is 50%, based on its age and the I/O rate of this workload (see Equation 1 and FIG. 4). Then the future expected access time (FEAT) for the selected command may be calculated as follows:

$$\text{FEAT}=Q128\text{I/O Rate}+\text{Prob}*(Q1\text{I/O Rate}-Q128\text{I/O Rate}) \qquad \text{Eq. 2:}$$

Or more specifically for the example described above, $$\text{FEAT}=300+0.5*(500-300)=400 \text{ Wedges to execute the selected command}$$

In some embodiments, the FEAT of Equation 2 may be the weighted average of the Q128 value and the Q1 value, and it may converge on the Q1 value when the probability of time out reaches 100%. The FEAT value can be used to represent the average expected access time this command will have if left in the queue, instead of being activated as the next command or re-positioned to a selected place in a queue.

Figure 6:
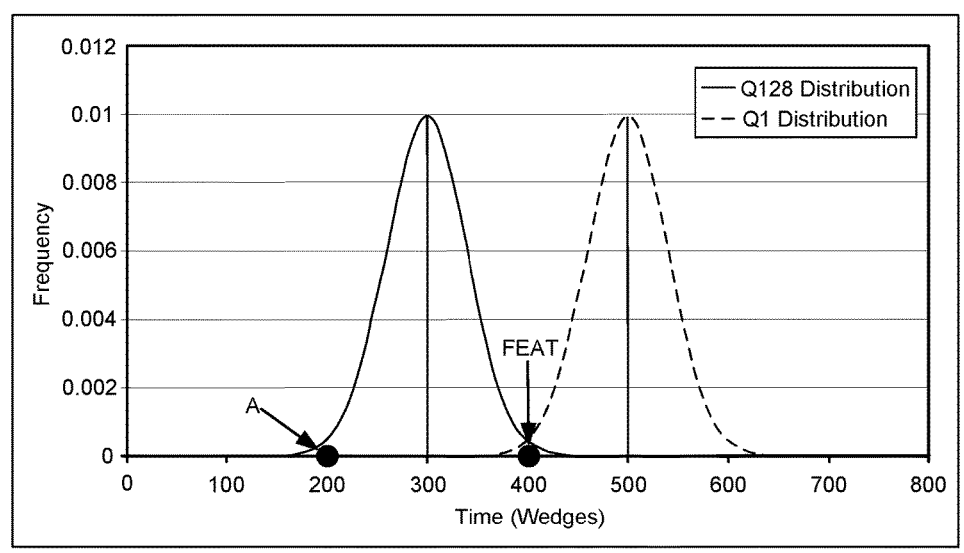
FIG. 6 is a graph of a system employing probabilistic aging command sorting, in accordance with certain embodiments of the present disclosure.

FIG. 6 is a graph 600 of a system employing probabilistic aging command sorting, in accordance with certain embodiments of the present disclosure. Graph 600 depicts an example of a selected command 'A,' according to the calculations discussed above. The calculated FEAT of 400 is indicated on the graph. This FEAT value of 400 indicates an estimated average access time if the command A is left in the queue.

Suppose an initial or "base" access time for command A in the queue of depth 128 is calculated to be 200 wedges, as shown on graph 600. For example, this initial or base access time, as described above, may be calculated as seek time+ rotational latency. The base access time may be calculated for a current head and disc position, or for an anticipated head and disc position after executing another given command. The base access time of 200 wedges may be a very fast access time relative to the Q128 distribution, and may be well above the FEAT calculated above. Relative benefit or detriment of activating the selected command may be calculated, for example, as:

$$\text{FEAT}-\text{base access time}$$

In this case, the relative benefit or detriment may be calculated as 400−200=200. So in general, activating command A at the calculated position would represent a relative benefit of 200 wedges compared to leaving the command at its current queue position. For example, in systems that calculate which command to execute next from all commands in a queue, the system may choose to execute command A next rather than leaving it in the queue for execution later, depending on calculated values of other queued commands. In some embodiments, a device may compare the FEAT to the base access time to determine whether to activate the command now or to place it in a corresponding command queue slot. If the comparison is positive, it may indicate that the command should be placed into the tested slot; if the comparison is negative, it may indicate that the command should not be relocated to the tested slot.

Figure 7:
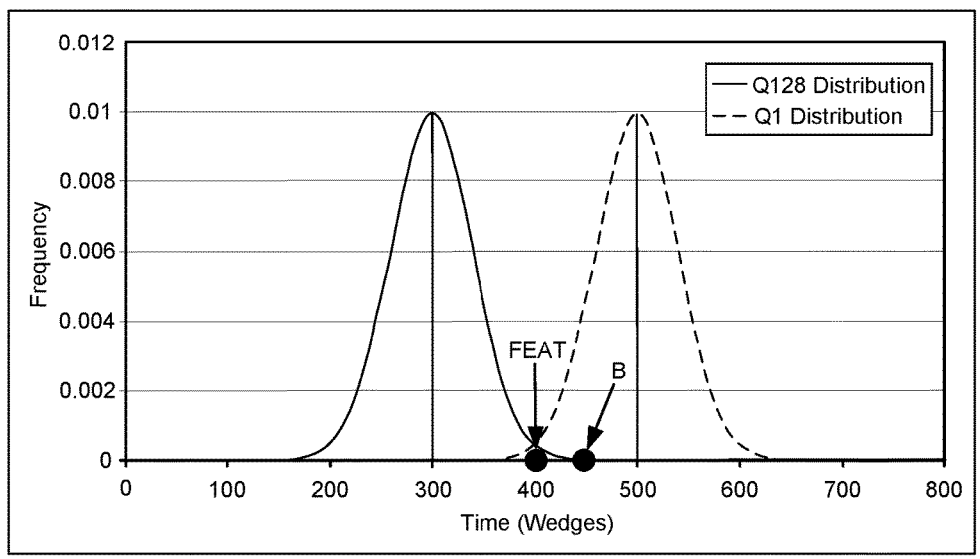
FIG. 7 is a graph 700 of a system employing probabilistic aging command sorting, in accordance with certain embodiments of the present disclosure.

FIG. 7 is a graph 700 of a system employing probabilistic aging command sorting, in accordance with certain embodiments of the present disclosure. Graph 700 depicts another example of a selected command 'B,' according to the calculations discussed above. Once again, the FEAT, as calculate above, is 400 wedges, as shown on graph 700. An initial or base access time for selected command B, in the queue of 128, may be calculated to be 450 wedges, as shown on graph 700. 450 wedges may be a slow access time relative to the Q128 distribution, and is slower than the FEAT of 400 calculated above. In general, activating command B now would represent a relative negative over re-queuing of −50 wedges. For example, FEAT−base access time, in this case, is 400−450=−50 wedges. From the examples of FIGS. 6 and 7, it can be seen that command timeouts may complicate the reordering process. The probability of a command time out may be incorporated into access time calculations, as described below.

The following values may be estimated or determined for a given device:

$$\text{AverageAccessTimeForWorkload (ATWL)}=\text{Estimated} \quad \text{Eq. 3:}$$

$$\text{Queue 1 Access Time (}Q1AT\text{)}=\text{Estimated} \quad \text{Eq. 4:}$$

$$\text{IORate}=\text{Estimated} \quad \text{Eq. 5:}$$

ATWL may refer to an average I/O rate at a given queue depth in terms of wedges per I/O operation. For example, this may be a representation of an average number of wedges per I/O operation when operating at a queue depth of 128. In some embodiments, a drive may store a number of ATWL values for different workload sizes, it may store a single representative value (e.g. average workload), it may store a "worst case" value for a full queue workload, it may store other values, or any combination thereof. Q1AT may refer to an average I/O rate in terms of wedges per operation for unqueued operations (e.g. if the commands were being processed in first-in first-out (FIFO) order, rather than by selecting optimal commands from a queued list). IORate may refer to an average number of operations per second at a given queue depth. Again, a number of IORates may be stored, one or more representative values may be stored, or any combination thereof.

For example, ATWL, Q1AT, and IORate may be determined by a manufacturer of the device based on a device's components and performance attributes, and stored to the device for accessing. In some embodiments, these values may be determined or measured by a drive or device during operation. Other embodiments are also possible.

The following values may be calculated for each command:

$$\text{Access Time (AT)}=\text{Seek Time}+\text{Rotational Latency;} \quad \text{Eq. 6:}$$

$$\text{Time Remaining Before Time Out (Time)}=\text{Time Out Limit}-\text{Age of Command;} \quad \text{Eq. 7:}$$

$$\text{Opportunities Remaining In Queue(}X\text{)}=\text{Time}*\text{IORate;} \quad \text{Eq. 8:}$$

$$\text{Probability of Time Out (Prob)}=(\text{Queue Depth}-1)/(\text{Queue Depth})^x; \quad \text{Eq. 1:}$$

$$\text{Future Expected Access Time (FEAT)}=\text{ATWL}+\text{Prob}*(Q1AT-\text{ATWL}); \quad \text{Eq. 9:}$$

$$\text{Time Out Adjusted AT (TAAT)}=\text{AT}-(\text{FEAT}-\text{AT}); \quad \text{Eq. 10:}$$

As may be seen above, the TAAT for a command may be the command's AT (or "base" access time unmodified by a time out probability), modified by the comparison of the time out probability-modified FEAT and the AT. In some embodiments, a device may compare the TAAT of commands within a command queue to determine an order to execute the commands. For example, the TAAT for each command may be calculated, and the command with the lowest TAAT may be selected for execution next. TAAT may be simplified, as follows, $$\text{TAAT}=2\text{AT}-\text{ATWL}-\text{Prob}*(Q1AT-\text{ATWL}); \quad \text{Eq. 11:}$$

In some embodiments, ATWL may be a predetermined value (e.g. calculated by a manufacturer), and therefore may be considered a constant for any given workload. Adding a constant to all commands in the queue may not change their order, so it may be removed from the TAAT calculation. Also, since dividing all access times by two may not change a command order, TAAT may be further simplified:

$$\text{TAAT}=\text{AT}-\text{Prob}*(Q1AT-\text{ATWL})/2 \quad \text{Eq. 12:}$$

In some embodiments, a lookup table (LUT) may be used in place of performing some calculations. For example, using a lookup table may avoid the need to perform exponent calculations when computing the Probability of Time Out value. Rather than having a lookup table for all possible queue depths, a number of lookup tables for selected queue depths could be used (e.g. 16, 32, 64, etc.), and a closest approximate queue-depth table could be used for calculations. Lookup tables for one or more queue depths could be stored, and index scaling could be employed to account for variations in the actual queue depth.

An example of employing index scaling on a lookup table may include:
1. Create a probability of time out lookup table for some base queue depth value ($Q_{base}$). For example, the $Q_{base}$ value may be an average queue depth for the device, a worst-case queue depth, or other queue depths.
2. Scale the index into the table (X) by the scalar $Q_{base}$/Queue Depth. Queue Depth can refer to an actual or current queue depth when performing the calculations.

For example, a probability of time out lookup table for a selected base queue depth $Q_{base}$ may be populated with values based on the equation:

$$\text{Probability }(Q_{base})=((Q_{base}-1)/Q_{base})^x; \quad \text{Eq. 13:}$$

for some input value 'X,' with X indicating a number of IO opportunities left before a command times out. Similarly, a lookup table for an actual queue depth 'Q' may be populated with values based on the equation:

$$\text{Probability }(Q)=((Q-1)/Q)^x; \quad \text{Eq. 14:}$$

It can be assumed that 'Probability (Q)' differs from 'Probability (Qbase)' by only a scaling constant 'C' on the exponent 'X':

$$\text{Probability }(Q)=((Q-1)/Q)^x=((Q_{base}-1)/Q_{base})^{cx}; \quad \text{Eq. 15:}$$

By taking the logarithm of both sides, and solving for 'C,' it can be seen that:

$$C=\log((Q-1)/Q)/\log((Q_{base}-1)/Q_{base})); \quad \text{Eq. 16:}$$

The probability of time out can then be calculated using a lookup table, as:

Probability of Time Out (Prob)=Probability Table
    [$C*X$]; Eq. 17:

In some examples, using the probability table architecture derived above, the new process steps may include calculating, for each command:

Access Time (AT)=Seek Time+Rotational Latency; Eq. 6:

Time Remaining Before Time Out (Time)=Time Out
    Limit−Age of Command; Eq. 7:

Opportunities Remaining In Queue
    ($X$)=Time*IORate; Eq. 8:

$C=\log((Q-1)/Q)/\log((Q_{base}-1)/Q_{base})$; Eq. 16:

Probability of Time Out (Prob)=Probability Table
    [$C*X$]; Eq. 17:

TAAT=AT−Prob*($Q1AT$−ATWL)/2; Eq. 12:

assuming the same estimated or calculated values for ATWL, Q1AT, and IORate as described above.

The scaling constant "C" (eq. 16) acts to multiply the value of "X" (eq. 8) when used as an index into the probability table of equation 17, effectively reducing the number of index values and corresponding outputs from the probability table. For an example probability table calculated for $Q_{base}$ of 128, a queue depth ("Q") of 128 would produce a "C" value of 1, resulting into straight indexing into the probability table based on the value of "X". E.g., 1*X=X, so each value of X will produce a corresponding output from the probability table. For Q=64, 'C' would be ~2 (approximately 2), so indexing would take every other point from the probability table. E.g., if X=1, (2*X)=2; for X=2, (2*X)=4, etc, with the values of 1 and 3 being skipped (not able to be indexed at C=2). For Q=32, 'C' would be ~4, so indexing would access every 4th point from the probability table. Referring to FIG. 4, this effect can be illustratively seen. The 400th point for Q128~=to the 200th point for Q64~=100th point for Q32, with each corresponding to the same probability (%). A flowchart of executing commands based on probabilistic aging is depicted in regard to FIG. 8.

FIG. 8 is a flowchart of a method 800 for probabilistic aging command sorting, in accordance with certain embodiments of the present disclosure. The method 800 may be executed or performed by a combination of firmware, circuits, other executable commands, or any combination thereof. For example, the method 800 may be performed by the controller 108 of FIG. 1.

Using the equations described above, the method 800 for probabilistic aging command sorting may include selecting a command from a command queue for which to determine a probability-adjusted access time, at 802. The method 800 may include calculating an amount of time remaining before the selected command times out, based on equation 7, at 804. At 806, the time remaining may be multiplied by the current I/O rate, e.g. in I/Os per second, to determine the number of opportunities "X" remaining to execute the selected command, based on equation 8.

The method 800 may include using the current queue depth "Q" to calculate a scale factor "C", based on equation 16, at 808. The constant "C" may be multiplied by the number of execution opportunities remaining "X" to determine an indexing value used to retrieve a probability value from a probability LUT, based on equation 18, at 810. The index C*X may then be used to determine a probability estimate from the probability LUT, based on equation 17, at 812. The probability estimate may then be used to determine a time-out adjusted access time, based on equation 12, at 814. The method 800 may then include selecting an executing a command based on the time-out adjusted access time, at 816. For example, if the time-out adjusted access time indicates the selected command should be executed next, the system may execute the command. If the time-out adjusted access time still provides a slow access time relative to other commands, the selected command may be re-queued and a more efficient command may be executed next.

In an example embodiment, the current queue depth may be 32, the $Q_{base}$ value may be 128, the time remaining before timeout (Time) value may be 1 second, and the I/O rate may be 200 I/Os per second. Therefore, Time remaining (Eq. 7)=1 sec.

Opportunities remaining in queue "$X$"(Eq. 8)=(1 second)*(200 I/Os/sec)=200

C(Eq. 16)=log((32−1)/32)/log ((128−1)/128))=4.048

Probability table index=$C*X$=810

Probability of Time Out=Probability Table[810]=(127/128)^810=0.0017

The TAAT for the selected command could then be determined using equation 12, based on the probability of time out, the base access time for the command AT (seek time+rotational latency), and the estimated values for Q1AT and ATWL.

The algorithms and computations provided above are just some examples. Different equations, estimates, variables, and values can be used to calculate a probability of a command timing out and adjust command executions based on the probability. For example, the Timeout Adjusted Activation Time equation provided above may be simplified further by approximating variables. For example, rather than employing multiple probability tables, or using a scaling constant 'C,' a single probability look-up table could be used, for example using a "worst-case" full queue depth and disregarding the actual current queue depth. In some embodiments, ATWL, Q1AT, or both could be constants stored to a device. For example, a single ATWL value for a "worst-case" queue depth may be used.

Equation 16 provided above, for determining the scaling constant "C," may be too slow or inefficient to execute in real-time during device operation. Equation 16 may be simplified by using the linear approximation of: "Log(R)~R−1" for values of R close to 1. This can be a fairly good assumption given that ratio of (Q−1)/Q may be very close to 1 for the probability calculations. This approximation can lead to a simplified equation for 'C':

$C=Q_{base}/Q$ Eq. 18:

However, the approximation presented in equation 19 may not perform as well as equation 16 for some queue depths, such as low queue depths.

As an alternative to using the processing-intensive equation 16, or the approximation from equation 18, a pre-calculated LUT could be employed. Employing a pre-calculated LUT to determine the scaling constant "C" would allow for converting a generic time-out probability table based on a pre-selected $Q_{base}$ value into a queue-depth specific probability table based on the actual queue depth. The LUT for equation 16 may be referred to as a Queue Depth Adjustment Table (QDAT). The QDAT could be generated and stored to a nonvolatile memory of the device during a manufacturing process, and loaded into RAM or another memory during device operation. In some embodiments, the QDAT could be generated by the storage device after boot-up. The storage device could generate the QDAT the first time the device is employed for data access operations and stored to a non-volatile memory for future use, or the device could generate the QDAT every time the device is turned on, with the QDAT stored to a volatile memory.

FIG. 9 depicts an example representation of a lookup table 900 that may be stored to a data storage device to determine a scaling value "C". The table 900 may be referred to as the Queue Depth Adjustment Table, as the output of the table can be used to convert a single probably of timeout table to a queue-depth specific probability table based on a current queue depth. Values stored to the queue depth adjustment table can be pre-populated for equation 16 based on a pre-selected $Q_{base}$ value corresponding to the $Q_{base}$ value used for the probability table of equation 17 (used to determine a probability of time-out). In some embodiments, the queue depth value Q may not be greater than $Q_{base}$, so $Q_{base}$ may be set to the maximum number of commands the host queue can support. In embodiments where the queue depth adjustment table and probability table are calculated at the drive, new tables could be compiled as the queue depth reaches or approaches the $Q_{base}$ value, rather than maintaining tables for a $Q_{base}$ set to the maximum queue depth. In the depicted example, the $Q_{base}$ value may be 128.

For table 900, the first column 902 shows the input value "Q" representing the current queue depth. The second column 904 shows the output of the LUT based on the input value Q. The output value corresponds to the value that would be produced by equation 16, without the need for performing complex mathematical operations. The LUT 900 may have as many rows or entries as there are possible queue depths for the command queue. In some embodiments, queue depths of 1 may be excluded, so that the Queue Depth Adjustment Table contains (maximum queue depth–1) entries. The algorithm can be skipped at queue depth 1 as there may be only a single command to select and therefore no need to select a command execution order.

The output value from the second column 904 can be used along with the number of execution opportunities remaining for a selected command as an index to access the probability table, and determine a probability of the selected command timing out based on the current queue depth.

FIG. 10 is a flowchart of a method 1000 for probabilistic aging command sorting, in accordance with certain embodiments of the present disclosure. In particular, method 1000 shows an embodiment of utilizing the Queue Depth Adjustment Table from FIG. 9.

At 1002, the method 1000 may include determining a queue depth. The queue depth may be determined every time a new command is executed, or a queue depth measurement may be taken periodically (e.g. at an interval greater than once per command, such as every five seconds, or after every 10 commands are processed). For example, the system may store information for probability calculations and command selection (e.g. I/O rate, queue depth, transfer size, etc), as it becomes available as 'running sums,' and periodically may update the averages, after a prescribed amount of samples have been collected. So for 'queue depth', the system sum up some number of measurements (e.g. 2048) as it completes I/O's, and then may take the sum and 'shift right' by 11 bits (equivalent to dividing by 2048) to create the average.

When the queue depth is determined, the method 1000 may include using the queue depth to index into the Queue Depth Adjustment Table 900 and obtain a scaling factor "C", at 1004. If the queue depth is only measured periodically, the scaling factor may be stored to a memory or register for use whenever probability of timeout is to be calculated for a command. The stored scaling factor may be updated whenever a new queue depth measurement is taken.

At 1006, the scaling factor from the Queue Depth Adjustment Table may be used as an index to access the Probability Table and obtain a probability of time out scaled to the current queue depth value. In some embodiments, the scaling factor "C" may be multiplied by another values, such as a number of remaining execution opportunities "X" for the selected command, to obtain the index value used to access the Probability Table.

Employing the Queue Depth Adjustment Table to convert a generic Probability Table into a queue depth-specific probability table can provide significant performance improvement without introducing significant computational overhead.

Returning to selecting a command to execute based TAAT values, calculating TAAT is based on a statistical algorithm, so scenarios may rarely arise where an I/O operation is selected for a queue position even with a very poor calculated AT. A DSD may be configured to perform additional calculations or logic checks to limit such instances. For example, a DSD may be configured to exclude re-ordering of an operation if the calculated AT is greater than the Q1AT, meaning that the command will take longer to execute than an average command executed at a queue depth of 1. In some embodiments, a command may require an AT that is better than the Q1AT by some selected threshold. Other embodiments are also possible.

Figure 11:
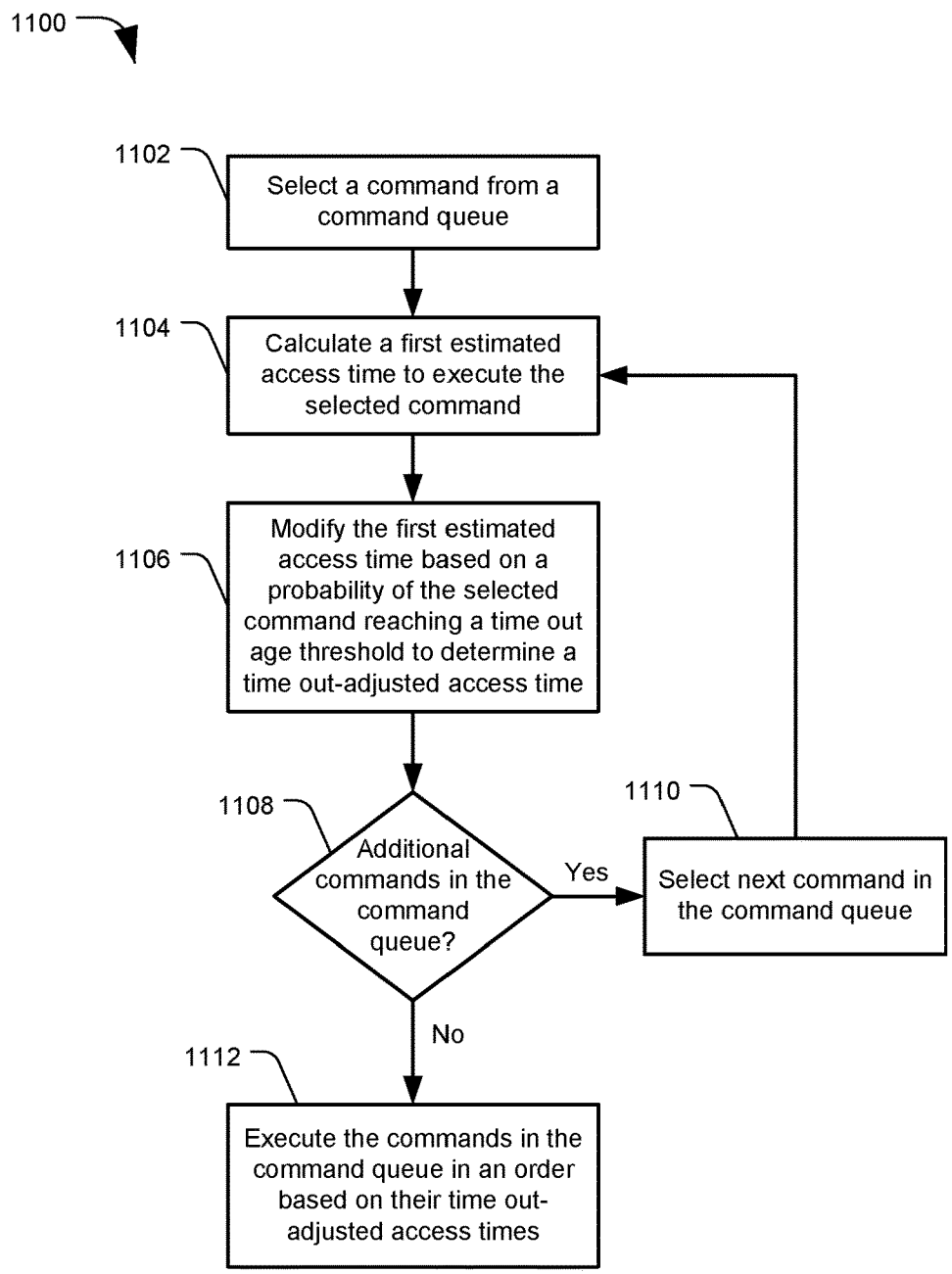
FIG. 11 is a flowchart of a method for probabilistic aging command sorting, in accordance with certain embodiments of the present disclosure.

FIG. 11 is a flowchart of a method 1100 for probabilistic aging command sorting, in accordance with certain embodiments of the present disclosure. Method 1100 may include selecting a command from a command queue, at 1102. In some embodiments, a device may calculate a time out-adjusted access time for each command in a queue to determine which command to execute next, or determine how to organize the commands. In some embodiments, only commands over a certain age may be selected and their time out probabilities calculated. In some embodiments, time out adjusted access times may be calculated for commands based on an associated priority; e.g. high-priority commands may have time out adjusted access times calculated to avoid time out, while low profile commands may not have time out adjusted access times calculated. Other embodiments are also possible.

Method 1100 may include calculating a first estimated access time to execute the selected command, at 1104. In some embodiments, calculating the access time may be based on an estimated seek time plus rotational latency for a given head and disc location. For example, the estimated access time may be based on an expected head and disc location on finishing the current command. In some embodiments, the estimated access time may be based on an anticipated head and disc location of after finishing another command in the queue to select a beneficial queue slot for the selected command. Other embodiments are also possible.

At 1106, the method 1100 may include modifying the first estimated access time based on a probability of the selected command reaching a time out age threshold, in order to determine a time out-adjusted access time. For example, the time out-adjusted access time may be compared against the computed access times of other commands in the queue to determine an execution order. In some embodiments, the more likely a command is to time out, the more the access time may be modified in favor of repositioning the command in the queue for earlier execution.

A determination may be made as to whether there are additional commands in the command queue, at 1108. For example, if a time out adjusted access time is calculated for every command in the command queue, the method 1100 may include cycling through each pending command to calculate the adjusted access times. In embodiments where only commands meeting a certain criteria (e.g. beyond a specified age threshold or having a certain priority) have a time out adjusted access time calculation, the method 1100 may include looking for any remaining commands meeting the criteria, at 1108. Other embodiments are also possible. If there are additional commands in the command queue that are to have adjusted access times calculated, at 1108, the next such command may be selected for evaluation at 1110, and the method may repeat from 1104.

If commands remain in the queue to have their adjusted access times calculated, at 1108, the method 1100 may include executing the commands in the command queue in an order based on their time out-adjusted access times, at 1112. For example, the time out-adjusted access time for a selected command may be used to determine whether to execute the selected command next out of the pending commands. In some examples, the time out-adjusted access time may be used to position the selected command in another slot of the command queue, for example based on where the command would cause the least amount of access time delay to execute. Other embodiments are also possible.

Figure 12:
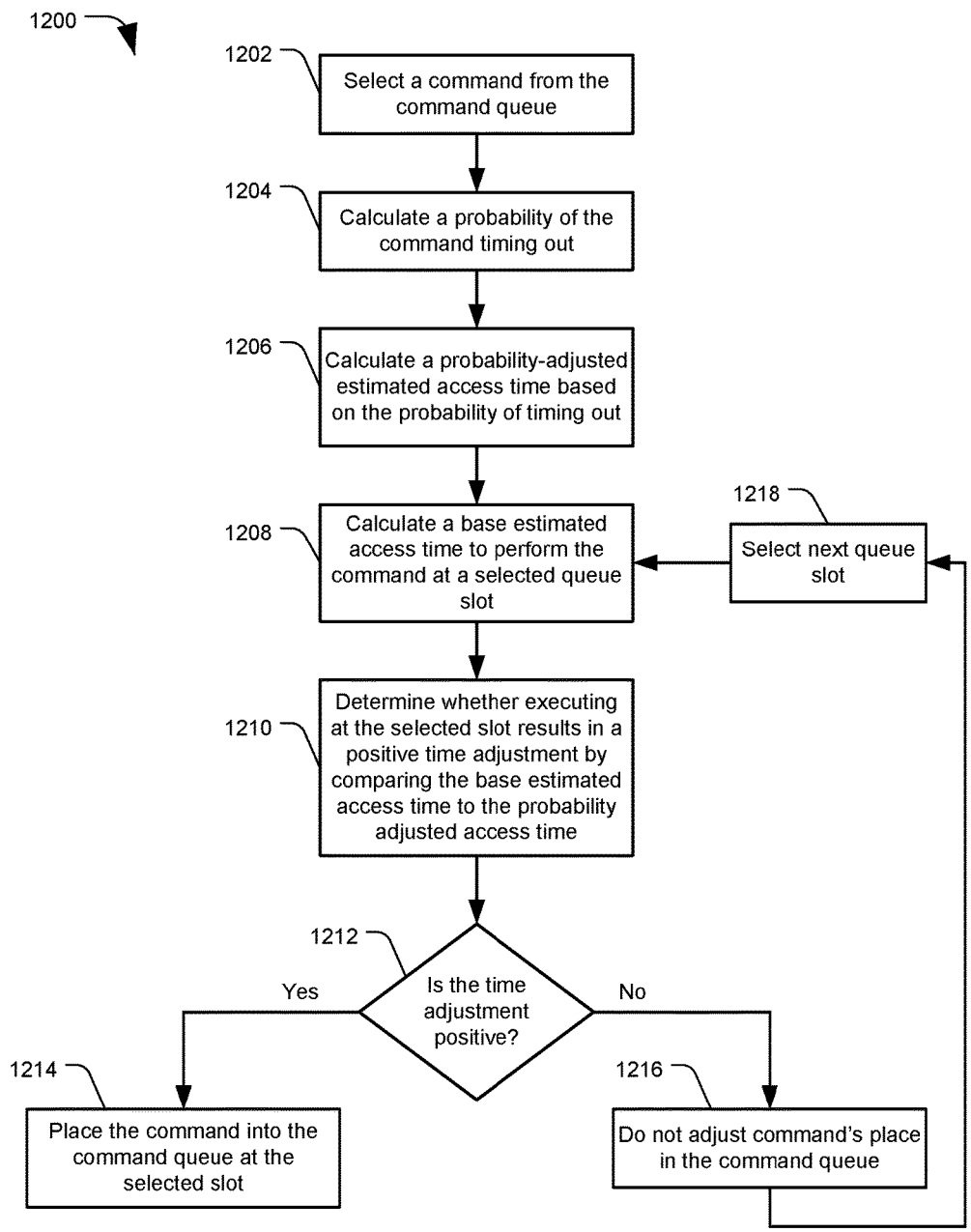
FIG. 12 is a flowchart of a method for probabilistic aging command sorting, in accordance with certain embodiments of the present disclosure.

FIG. 12 is a flowchart of a method 1200 for probabilistic aging command sorting, in accordance with certain embodiments of the present disclosure. Method 1200 may include selecting a command from a command queue, at 1202. In some embodiments, a device may calculate a timeout adjust access time for each command in a queue to determine which command to execute next. In other embodiments, only commands over a certain age may be selected and their time out probabilities calculated. Other embodiments are also possible.

Method 1200 may include calculating a probability of the command timing out, at 1204. For example, this may include performing an equation such as (Queue Depth−1)/(Queue Depth)$^X$, where X designates an estimated number of I/O opportunities remaining before the command times out. In other embodiments, calculating a probability of timeout may include determining a scaling value "C" from an LUT based on the queue depth, and then retrieving a probability of time-out value from a probability LUT based on the scaling value.

Method 1200 may include calculating a probability-adjusted estimated access time, at 1206, based on the probability of timing out calculated in 1204. For example, this may be calculated as the future expected access time (FEAT) described above, by multiplying the probability of timing out against a difference between an unqueued IO rate and an IO rate for a selected queue depth, added to the IO rate for the selected queue depth. In some embodiments, the probability-adjusted estimated access time may be stored in a lookup table. Other embodiments are also possible.

Method 1200 may include calculating a base estimated access time to perform the command at a selected point, at 1208. In some embodiments, calculating the access time may be based on an estimated seek time plus rotational latency for a given head and disc location. For example, the selected point may be immediately following the currently executing command, based on an expected head and disc location on finishing the current command. In some embodiments, the selected point may be at another location in the command queue, based on an anticipated head and disc location of the preceding command in the queue. Other embodiments are also possible.

At 1210, the method 1200 may include determining whether executing the selected command at the selected point from 1208 may result in a positive time adjustment, by comparing the base estimated access time to the probability adjusted access time. For example, if the probability adjusted access time is 450 wedges, and the base access time is 300 wedges, executing the selected command at the selected point may result in a net performance gain, and the time adjustment may be positive. If the probability adjusted access time is 450 wedges, and the base access time is 500 wedges, the time adjustment may be negative, resulting in an overall performance loss.

If the time adjustment is positive, at 1212, the method 1200 may include placing the command into the command queue at the selected point. In some embodiments, the selected point may be the next command for execution, and the selected command may be put at the front of the queue. If the time adjustment is not positive, at 1212, the method 1200 may include not adjusting the commands position in the command queue, at 1216.

In some embodiments, the method 1200 may select a command and compare the probability-adjusted access time against the next available execution slot. If executing the command at the next execution slot does not result in a positive time adjustment, at 1216, the method 1200 may include selecting the next highest slot in the command queue, at 1218, and calculating a base access time for that slot, at 1208.

Figure 13:
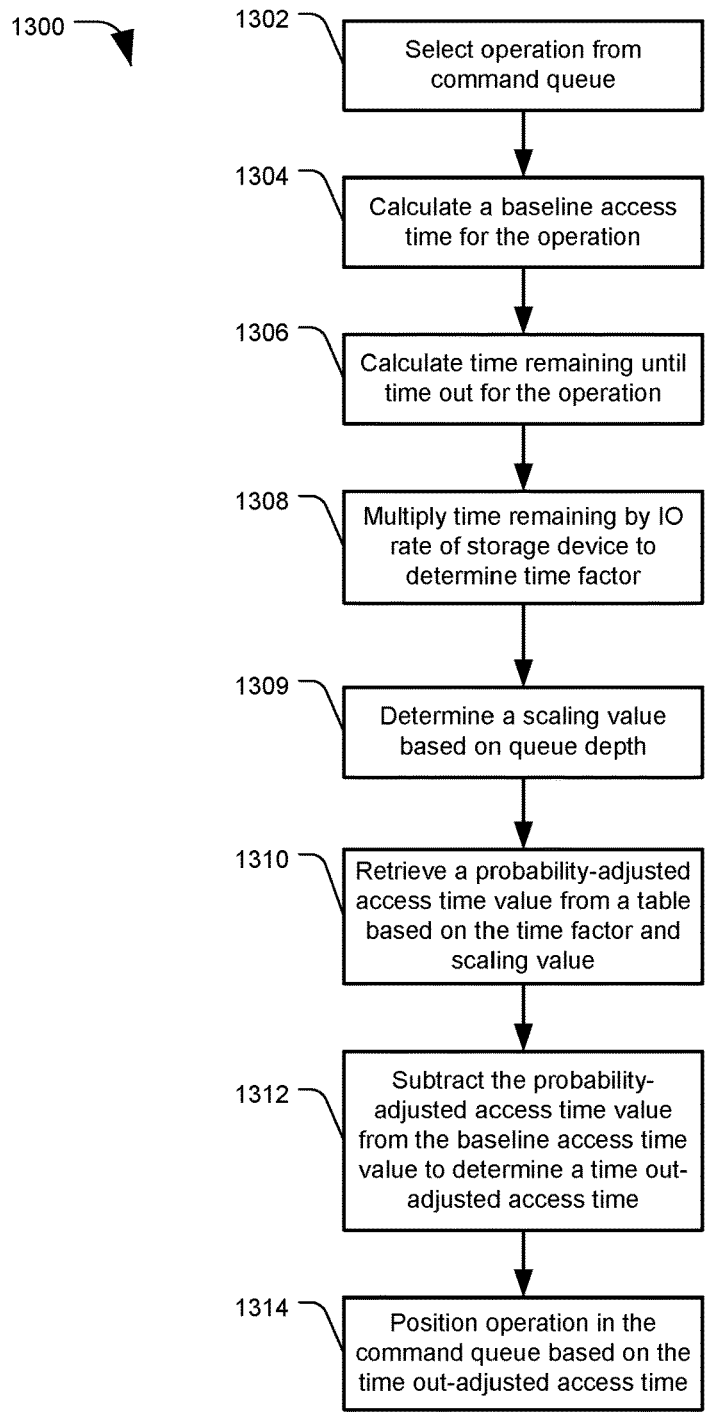
FIG. 13 is a flowchart of a method for probabilistic aging command sorting, in accordance with certain embodiments of the present disclosure.

FIG. 13 is a flowchart of a method 1300 for probabilistic aging command sorting, in accordance with certain embodiments of the present disclosure. Method 1300 may include selecting an operation from a command queue, at 1302. The method 1300 may include calculating a baseline access time for the operation, at 1304.

At 1306, the method may include calculating a time remaining until time out for the operation. For example, if the operation had a time limit of 2 seconds, and it remains in the command queue after 1.5 seconds, the operation may have 0.5 seconds remaining until time out.

The method 1300 may include multiplying the time remaining by an input/output (I/O) rate of the storage device to determine a time factor, at 1308 The I/O rate may be an estimated number of I/O operations the storage device may perform per second at a given queue depth. For example, if there are currently 32 operations in the command queue, the storage device may perform an average of 400 I/O operations per second. The method 1300 may include using an IO rate estimate based on a pre-determined queue depth, regardless of the current queue depth. When the I/O rate is multiplied by an amount of time remaining before the operation times out, the resulting time factor may be a number of I/O opportunities remaining before the selected operation reaches the time out threshold.

Method 1300 may include determining a scaling value "C" based on the queue depth (e.g. the number of commands in the queue). The scaling value "C" may be obtained from a pre-computed LUT based on different queue depths.

Method 1300 may include retrieving a probability-adjusted access time value from a table based on the time factor and the scaling value, at 1310. For example, if the time factor determined at 1308 indicates there are 300 I/O opportunities remaining before timing out, the time factor may be multiplied by the scaling value to obtain an index value used to look up a probability-adjusted access time value from a probability LUT. In some embodiments, a probability of time out value may be retrieved from the probability LUT, and that probability of time out value may be factored in with other calculated or estimated values to obtain the probability adjusted access time (e.g. Prob*(Q1AT−ATWL)/2). The probability-adjusted access time value may be a weighted value based on a probability of the operation timing out and estimated access times if the time out threshold is reached.

Method 1300 may include subtracting the probability-adjusted access time value from the baseline access time value to determine a time out-adjusted access time, at 1312. For example, this may result in an access time that is weighted towards earlier execution the closer the operation is to reaching the time out threshold. At 1310, the method may include positioning the operation in the command queue based on the time out-adjusted access time. This may include performing the selected operation as the next operation, or it may include inserting it into the queue at another position according to an ordering of commands based on time out-adjusted access time for the commands.

The methods, algorithms, devices, and processes described above for probabilistic aging command sorting can be applied using a variety of command sorting and executing techniques. For example, a data storage device using a shortest-access-time-first (SATF) approach, sometimes called a rotational positional sorting (RPS) algorithm, may use the probabilistic aging command sorting to select the order to execute commands. An SATF approach may calculate a timeout adjusted access time (TAAT) for one or more commands in a queue to determine which command to execute next. This process may be repeated during each operation to select the next operation based on a shortest access time. As commands come closer to their time out thresholds, their TAAT values may become lower, increasing the probability that the selected command will be executed next even if the selected command would not be the fastest to execute in practice.

The methods and systems described herein, as executed by a data storage controller circuit of a data storage device, can provide an improvement in device functionality by reducing the likelihood of commands timing out and increasing device reliability and overall command throughput. Employing LUTs in the form of the queue depth adjustment table, probability of time out table, and other tables can provide accurate calculations and estimates without requiring high computational overhead.

In some embodiments, the probabilistic aging command sorting may be used with a traveling salesman-type algorithm, which may determine a shortest access time for a set of N commands, instead of on a command-by-command basis. For example, N may be every command in the command queue, a selected number of commands, or a subset of the commands less than all of the commands. A set of N commands less than all of the commands may be selected based on the ages of the commands, based on storage medium localities accessed by the commands, transfer lengths of the commands, other factors, or any combination thereof. In some embodiments, a device may calculate the TAAT for commands in the command queue, the future expected access time (FEAT), other values, or any combination thereof, and the N commands may be selected based on the computed values. Once selected, the N commands may be ordered based on calculating probabilistic aging-adjusted access times. Other embodiments are also possible.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

The invention claimed is:

1. An apparatus comprising:
a hardware circuit configured to:
determine a first access time to execute a selected command from a command queue of pending commands to be executed by performing data access operations to a data storage device;
determine a queue depth value representing a number of pending commands in the command queue;
determine a scaling value from a queue depth adjustment table based on the queue depth value;
determine how likely the selected command reaching a time-out threshold is based on the scaling value and a time-out table for a base queue depth,
the time-out threshold representing a period within which the selected command is to be executed to avoid failure of the selected command,
the time out table storing values representing a likelihood of commands timing out at a pre-set base queue depth;
determine an adjusted access time for the selected command by modifying the first access time, the adjusted access time representing an estimated time to execute the selected command artificially adjusted based on how likely the selected command is to time out, resulting in the adjusted access time becoming artificially lower as a likelihood of the selected command reaching the time-out threshold increases;
manipulate a command queue selection algorithm by comparing the adjusted access time for the selected command against estimated access times for other commands in the command queue to determine a command execution order, such that the selected command is more likely to be selected for execution the more the adjusted access time is artificially lowered; and
execute the selected command at the data storage device at the first access time in an order based on the command execution order.

2. The apparatus of claim 1 further comprising:
the queue depth adjustment table is a lookup table configured to store a range of scaling values indexed based on the queue depth value.

3. The apparatus of claim 1 further comprising:
the adjusted access time is a weighted value based on how likely the selected command is to reach the time-out threshold, such that the selected command is increasingly likely to be selected for execution relative to other commands in the command queue as the selected command approaches the time-out threshold.

4. The apparatus of claim 1 comprising the hardware circuit further configured to:
determine a number of remaining opportunities for execution for the selected command before reaching the time-out threshold based on the time-out threshold and an age of the selected command; and
determine how likely the selected command is to reach the time-out threshold based on accessing the time-out table using an index derived from the number of remaining opportunities for execution and the scaling value.

5. The apparatus of claim 4 comprising the hardware circuit further configured to:
determine the number of remaining opportunities for execution further based on an estimated input/output (IO) rate representing an average number of IO operations per second the apparatus can complete based on a number of commands in the command queue.

6. The apparatus of claim 1 comprising the hardware circuit further configured to:
apply the scaling value to convert the time-out table from a base table set for a selected base queue depth to a queue-depth specific table based on the number of pending commands in the command queue.

7. The apparatus of claim 1 comprising the hardware circuit further configured to:
determine the queue depth value periodically by performing a queue depth measurement; and
determine the scaling value when a new queue depth measurement is taken.

8. The apparatus of claim 1 further comprising:
a disc data storage medium;
a transducer head to perform data access operations to the disc data storage medium;
the hardware circuit further configured to:
determine the first access time based on a seek time and a rotational latency to position the transducer head over a target area of the disc data storage medium; and
execute the selected command by accessing the disc data storage medium.

9. An apparatus comprising:
a disc data storage medium;
a transducer head configured to move relative to the disc data storage medium to access data from different locations on the disc data storage medium;
a memory storing a command queue of pending commands;
a hardware controller circuit configured to:
access the memory to determine a first access time to execute a selected command from the command queue, including how long it will take to move the transducer head to a target location over the disc data storage medium to perform the selected command;
determine a scaling value from a queue depth adjustment table based on a number of pending commands in the command queue;
determine how likely the selected command reaching a time-out threshold is based on the scaling value and a time-out table,
the time-out threshold representing a period within which the selected command is to be executed to avoid failure of the selected command,
the time out table storing values representing a likelihood of commands timing out at a selected queue depth;
adjust the first access time based on how likely the selected command is to reach the time-out threshold in order to obtain an adjusted access time used for command selection from the command queue;
compare the adjusted access time for the selected command to access times for other commands in the command queue;
select the selected command for execution when the adjusted access time is superior to the access times of the other commands; and
execute the selected command at the first access time by moving the transducer head to the target location to access the disc data storage medium.

10. The apparatus of claim 9 further comprising:
the queue depth adjustment table is a lookup table configured to store a range of scaling values indexed based on the number of pending commands in the command queue.

11. The apparatus of claim 10 further comprising:
the adjusted access time is a weighted value based on the first access time and how likely the selected command is to reach the time-out threshold so that the selected command is more likely to be selected for execution relative to other commands in the command queue as the selected command gets closer to reaching the time-out threshold.

12. The apparatus of claim 11 comprising the hardware controller circuit further configured to:
apply the scaling value to convert the time-out table from a base table set for a selected base queue depth to a queue-depth specific table based on the number of pending commands in the command queue.

13. The apparatus of claim 12 comprising the hardware controller circuit further configured to:
determine the number of pending commands in the command queue periodically by performing a queue depth measurement; and
determine the scaling value when a new queue depth measurement is taken.

14. The apparatus of claim 13 further comprising:
the hardware controller circuit further configured to determine the first access time based on a seek time and a rotational latency required to position the transducer head over the target area of the disc data storage medium.

15. The apparatus of claim 14 comprising the hardware controller circuit further configured to:
determine a number of remaining opportunities for execution for the selected command before reaching the time-out threshold based on:
the time-out threshold;
an age of the selected command;
an estimated input/output (IO) rate representing an average number of IO operations per second the data storage device can complete based on a number of commands in the command queue; and determine how likely the selected command is to reach the time-out threshold based on accessing the time-out table using an index derived from the number of remaining opportunities for execution and the scaling value.

16. A method comprising:

determining, at a data storage device, a first access time to execute a selected command from a command queue;

determining a queue depth value representing a number of pending commands in the command queue;

determining a scaling value using a queue depth adjustment lookup table based on the queue depth value;

determining how likely the selected command reaching a time-out threshold is based on the scaling value and a time-out table for a base queue depth, the time-out threshold representing a period within which the selected command must be executed to avoid failure of the selected command, the time out table storing values representing a likelihood of commands timing out at a pre-set base queue depth;

determining an adjusted access time for the selected command by modifying the first access time based on how likely the selected command is to time out, resulting in the adjusted access time becoming artificially lower as a likelihood of the selected command reaching the time-out threshold increases; and executing the selected command in an order based on the adjusted access time.

17. The method of claim 16 further comprising:

the adjusted access time is a weighted value based on how likely the selected command is to reaching the time-out threshold, so that the selected command is more likely to be selected for execution relative to other commands in the command queue as the selected command gets closer to reaching the time-out threshold.

18. The method of claim 16 further comprising:

determining a number of remaining opportunities for execution for the selected command before reaching the time-out threshold based on:

the time-out threshold;

an age of the selected command;

an estimated input/output (IO) rate representing an average number of IO operations per second the data storage device can complete based on a number of commands in the command queue; and determining how likely the selected command is to reach the time-out threshold based on accessing the time-out table using an index derived from the number of remaining opportunities for execution and the scaling value.

19. The method of claim 16 further comprising:

determining the queue depth value periodically by performing a queue depth measurement; and determining the scaling value when a new queue depth measurement is taken.

20. The method of claim 16 further comprising:

determining the first access time based on a seek time and a rotational latency required to position a transducer head over a target area of a disc data storage medium of the data storage device; and executing the selected command by accessing the disc data storage medium.

* * * * *